United States Patent
Motomura et al.

(10) Patent No.: US 10,232,293 B2
(45) Date of Patent: Mar. 19, 2019

(54) FIBER LAMINATE AND MANUFACTURING METHOD THEREOF

(71) Applicant: Panasonic Intellectual Property Management Co., Ltd., Osaka (JP)

(72) Inventors: Koji Motomura, Osaka (JP); Nobuhiro Nishizaki, Osaka (JP); Kouji Ikeda, Hyogo (JP); Takahiko Murata, Osaka (JP); Takatoshi Mitsushima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 76 days.

(21) Appl. No.: 15/411,277

(22) Filed: Jan. 20, 2017

(65) Prior Publication Data
US 2017/0252685 A1    Sep. 7, 2017

(30) Foreign Application Priority Data

Mar. 2, 2016 (JP) ................. 2016-040480

(51) Int. Cl.
*B01D 53/22* (2006.01)
*B01D 39/16* (2006.01)
(Continued)

(52) U.S. Cl.
CPC .............. *B01D 39/163* (2013.01); *B32B 3/28* (2013.01); *B32B 5/022* (2013.01); *B32B 5/024* (2013.01);
(Continued)

(58) Field of Classification Search
CPC ................ B32B 5/024; B32B 2250/03; B32B 2262/0261; B32B 2262/0276; B32B 5/022; B32B 2250/20; B32B 2037/1215; B32B 2262/0246; B32B 2255/26; B32B 3/28; B32B 5/26; B32B 37/0053; B32B 2255/02; B32B 7/14; B32B 37/1292; B32B 2262/0253; B32B 37/1207;
(Continued)

(56) References Cited

U.S. PATENT DOCUMENTS 2,707,308 A * 5/1955 Taylor ................... A24D 3/022
                                                131/343
4,626,307 A * 12/1986 Cherkas ................ B01D 29/111
                                                156/218
(Continued)

FOREIGN PATENT DOCUMENTS

JP    2003-339761 A    12/2003
JP    2014-080030 A    5/2014
(Continued)

*Primary Examiner* — Anthony R Schumate
(74) *Attorney, Agent, or Firm* — Pearne & Gordon LLP

(57) ABSTRACT

A fiber laminate includes a first fiber sheet containing first fibers, a second fiber sheet laminated on the first fiber sheet and containing second fibers, and an adhesive interposed between the first fiber sheet and the second fiber sheet. The adhesive is disposed to form a linear first region in the fiber laminate when viewed from a normal direction of a principal surface of the fiber laminate. The first fiber sheet and the second fiber sheet are adhered to each other via the first region. A gap is formed between the first fiber sheet and the second fiber sheet in a second region other than the first region.

11 Claims, 3 Drawing Sheets

(51) Int. Cl.
  *B32B 3/28* (2006.01)
  *B32B 5/02* (2006.01)
  *B32B 5/26* (2006.01)
  *B32B 7/14* (2006.01)
  *D04H 1/56* (2006.01)
  *D04H 1/593* (2012.01)
  *D04H 1/62* (2006.01)
  *B32B 37/12* (2006.01)
  *B32B 37/00* (2006.01)

(52) U.S. Cl.
  CPC .............. *B32B 5/026* (2013.01); *B32B 5/26* (2013.01); *B32B 7/14* (2013.01); *D04H 1/56* (2013.01); *D04H 1/593* (2013.01); *D04H 1/62* (2013.01); *B01D 2239/0622* (2013.01); *B01D 2239/0681* (2013.01); *B01D 2239/0686* (2013.01); *B01D 2239/10* (2013.01); *B01D 2239/1233* (2013.01); *B32B 37/0053* (2013.01); *B32B 37/1207* (2013.01); *B32B 37/1292* (2013.01); *B32B 2037/1215* (2013.01); *B32B 2250/03* (2013.01); *B32B 2250/20* (2013.01); *B32B 2255/02* (2013.01); *B32B 2255/26* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2262/062* (2013.01); *B32B 2262/101* (2013.01); *B32B 2307/724* (2013.01); *B32B 2432/00* (2013.01); *B32B 2437/00* (2013.01); *B32B 2457/10* (2013.01); *B32B 2457/18* (2013.01); *B32B 2535/00* (2013.01); *D10B 2505/04* (2013.01)

(58) Field of Classification Search
  CPC ............ B32B 2262/0238; B32B 5/026; B32B 2262/0284; B32B 2262/0292; B32B 2262/062; B32B 2262/101; B32B 2307/724; B32B 2432/00; B32B 2437/00; B32B 2457/10; B32B 2457/18; B32B 2535/00; B01D 2239/0686; B01D 2239/10; B01D 2239/0622; B01D 2239/0681; B01D 2239/1233; B01D 39/163; D04H 1/56; D04H 1/62; D04H 1/593
  See application file for complete search history.

(56) References Cited

U.S. PATENT DOCUMENTS

| | | | | |
|---|---|---|---|---|
| 5,240,479 | A | * | 8/1993 | Bachinski ............... A62B 23/02 128/206.12 |
| 5,503,745 | A | * | 4/1996 | Ogata .................... B01D 39/08 210/490 |
| 5,714,226 | A | * | 2/1998 | Disselbeck ........... B29C 51/002 428/107 |
| D822,752 | S | * | 7/2018 | Yuyama ....................... D16/230 |
| 2002/0023655 | A1 | * | 2/2002 | Fietkau .................... A24C 5/24 131/284 |
| 2002/0193765 | A1 | | 12/2002 | Kudo et al. |
| 2006/0029778 | A1 | * | 2/2006 | Sekiguchi ................ D03D 1/00 428/181 |
| 2008/0269850 | A1 | | 10/2008 | Dodo |
| 2009/0087636 | A1 | * | 4/2009 | Yasuda .................. A61F 13/534 428/220 |
| 2010/0242201 | A1 | * | 9/2010 | Linzell .................... A45D 34/04 15/229.11 |
| 2011/0183121 | A1 | | 7/2011 | Van Berlo |
| 2015/0136298 | A1 | * | 5/2015 | Huyghe ................... B32B 25/08 152/537 |
| 2016/0199766 | A1 | * | 7/2016 | Motomura ............ B01D 39/18 55/467 |
| 2017/0151748 | A1 | * | 6/2017 | Motomura ................ B32B 5/08 |
| 2017/0217124 | A1 | * | 8/2017 | Ikeda ................. B32B 38/0004 |
| 2018/0093214 | A1 | * | 4/2018 | Motomura ......... B01D 46/0036 |

FOREIGN PATENT DOCUMENTS

| | | |
|---|---|---|
| JP | 2014-121699 A | 7/2014 |
| WO | 2006/006664 A1 | 1/2006 |

* cited by examiner

FIBER LAMINATE AND MANUFACTURING METHOD THEREOF

BACKGROUND

1. Technical Field

The present disclosure relates to a fiber laminate in which a plurality of fiber sheets are laminated by using an adhesive, and a manufacturing method of the fiber laminate.

2. Description of the Related Art

A fiber laminate in which a plurality of fiber sheets (nonwoven fabrics or the like) are laminated has high strength, and are thus used for various applications. For example, Japanese Patent Unexamined Publication No. 2014-121699 has proposed that a laminate is used as a filter medium of an air purifier. This laminate includes a nonwoven fabric as a base material, another nonwoven fabric as a protection layer, and an ultrafine fiber layer interposed therebetween. The laminate is manufactured, for example, by accumulating ultrafine fibers on the nonwoven fabric as a base material according to an electrostatic spinning method, applying an adhesive thereon, and laminating another nonwoven fabric as a protection layer.

SUMMARY

The present disclosure provides a fiber laminate and a manufacturing method thereof, capable of suppressing a pressure loss and increasing dust collection efficiency.

According to the present disclosure, there is provided a fiber laminate including a first fiber sheet containing first fibers, a second fiber sheet laminated on the first fiber sheet and containing second fibers, and an adhesive interposed between the first fiber sheet and the second fiber sheet. The adhesive is disposed to form a linear first region in the fiber laminate when viewed from a normal direction of a principal surface of the fiber laminate. The first fiber sheet and the second fiber sheet are adhered to each other via the first region. A gap is formed between the first fiber sheet and the second fiber sheet in a second region other than the first region.

In a manufacturing method of a fiber laminate of the present disclosure, a strip-shaped first fiber sheet containing first fibers and a strip-shaped second fiber sheet containing second fibers are prepared. Next, an adhesive is applied on a principal surface of the first fiber sheet in a linear form. The second fiber sheet is laid on the principal surface of the first fiber sheet, and the first fiber sheet is adhered to the second fiber sheet via the adhesive so that at least one of the second fiber sheet and the first fiber sheet has a wavy shape. Thus, a gap is formed between the first fiber sheet and the second fiber sheet.

According to the fiber laminate related to the present disclosure, it is possible to suppress a pressure loss and increase dust collection efficiency.

DETAILED DESCRIPTION OF PREFERRED EMBODIMENTS

Prior to description of an embodiment of the present disclosure, a problem of a laminate of the related art will be described briefly. In a case where a plurality of sheets are laminated via an adhesive, peeling occurs between the sheets if an amount of the adhesive is not sufficient. If an amount of the adhesive is increased in order to prevent peeling between the sheets, ventilation is deteriorated due to the adhesive, and a pressure loss is increased. In other words, sufficient dust collection efficiency cannot be obtained.

Fiber Laminate

Hereinafter, with reference to the drawings as appropriate, a fiber laminate according to the present embodiment will be described in detail.

Figure 1:
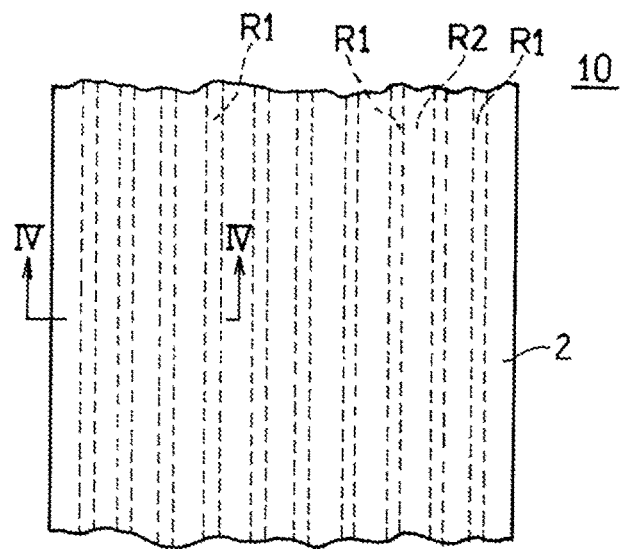
FIG. 1 is a top view schematically illustrating a fiber laminate according to an embodiment of the present disclosure.

FIG. 1 is a top view schematically illustrating fiber laminate 10 according to the present embodiment. A contour of fiber laminate 10 is not particularly limited as long as the number of sides (edge sides) can be recognized (that is, as long as fiber laminate 10 is not a circle or an ellipse), and fiber laminate 10 may be a long member (strip-shaped member) as illustrated in FIG. 1, may have a rectangular shape, and may have other polygonal shapes. Hereinafter, as an example, a description will be made of a case where fiber laminate 10 is a long member.

Figure 2:
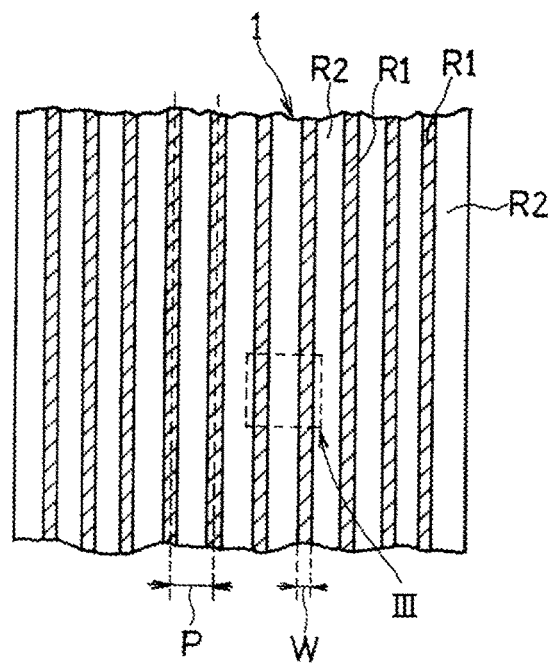
FIG. 2 is a schematic view in which a first fiber sheet and an adhesive are viewed from the top of the fiber laminate in a state in which a second fiber sheet and a third fiber sheet are omitted in the fiber laminate illustrated in FIG. 1.
Figure 3:
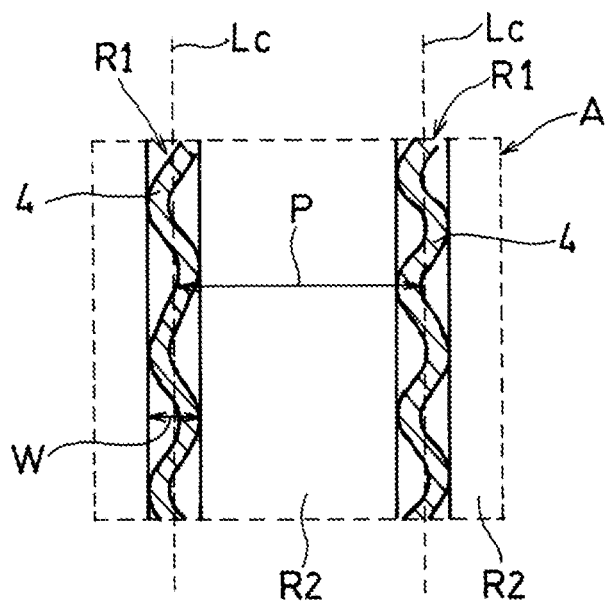
FIG. 3 is an enlarged view schematically illustrating a region III in FIG. 2.
Figure 4:
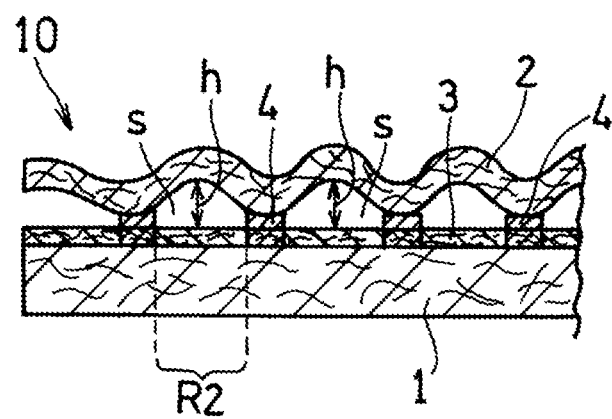
FIG. 4 is a sectional view taken along the line IV-IV in FIG. 1.
Figure 5:
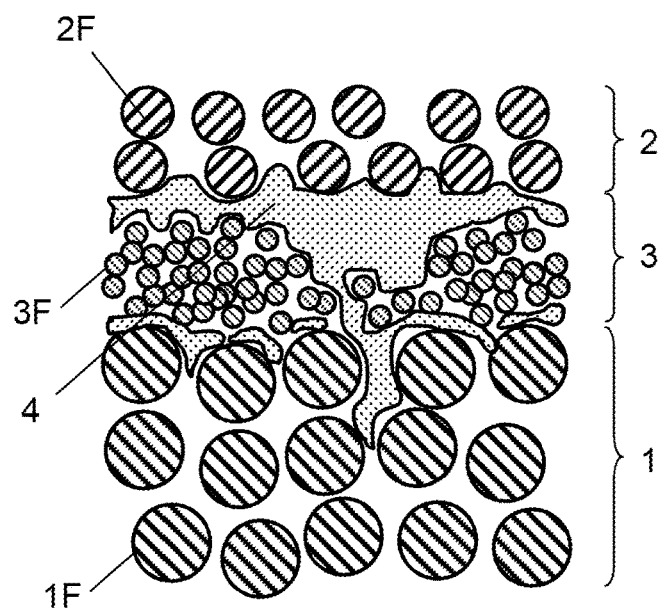
FIG. 5 is a partially enlarged sectional view of the fiber laminate illustrated in FIG. 4.

FIG. 2 is a schematic view in which first fiber sheet 1 and an adhesive disposed on first fiber sheet 1 are viewed from the top side (a normal direction of a principal surface) of fiber laminate 10 in a state in which a second fiber sheet and a third fiber sheet are omitted in fiber laminate 10 illustrated in FIG. 1. FIG. 3 is an enlarged view schematically illustrating a region III in FIG. 2. FIG. 4 is a sectional view taken along the line IV-IV line in FIG. 1. FIG. 5 is a partially enlarged sectional view of the fiber laminate illustrated in FIG. 4.

Fiber laminate 10 includes a first fiber sheet 1 containing first fibers 1F; second fiber sheet 2 laminated on first fiber sheet 1 and containing second fibers 2F; and adhesive 4 interposed between first fiber sheet 1 and second fiber sheet 2. As illustrated in FIGS. 4 and 5, fiber laminate 10 may further include third fiber sheet 3. When viewed from the normal direction of the principal surface of fiber laminate 10, adhesive 4 is disposed to form a linear region (first region R1) in fiber laminate 10, and the first fiber sheet and the second fiber sheet are adhered to each other via first region R1. In FIGS. 2 and 3, linear first region R1 in which the adhesive is disposed is hatched. In a region (second region R2) other than first region R1, gap s is formed between the first fiber sheet 1 and second fiber sheet 2.

The fiber sheet containing the fibers indicates that the fibers are contained as main components. In this case, the content of the main components is 80% by weight or greater. In other words, first fiber sheet 1 contains first fibers 1F as main components, and second fiber sheet 2 contains second fibers 2F as main components.

In a fiber laminate of the related art, from the viewpoint of suppressing peeling between fiber sheets such as nonwoven fabrics, an adhesive is applied on the entire interface between the fiber sheets as uniformly as possible. However, in this case, a pressure loss of the fiber laminate increases. On the other hand, in fiber laminate 10, adhesive 4 is disposed linearly when viewed from the normal direction of the principal surface thereof. Consequently, it is possible to suppress a pressure loss, and also to suppress peeling between the fiber sheets even in a case where adhesive 4 is used in a smaller amount than in the related art. Gap s is formed between first fiber sheet 1 and second fiber sheet 2 in second region R2 other than linear first region R1 in which adhesive 4 is disposed, and thus it is possible to increase dust collection efficiency. The reason that the dust collection efficiency increases is not certain, but may be that the gap is formed in second region R2, and thus at least one of first fiber sheet 1 and second fiber sheet 2 has a wavy shape so that a surface area increases.

The linear first region R1 is a strip-shaped region adhered via adhesive 4 which is applied in a linear form, and containing linear adhesive 4, in fiber laminate 10.

First, examples of the respective fiber sheets and adhesive 4 will be described in detail as a form appropriate for a filter medium of an air purifier. Applications of fiber laminate 10 are not limited to a filter medium.

First Fiber Sheet

First fiber sheet 1 is, for example, a support member (base material) supporting second fiber sheet 2 (and third fiber sheet 3 which will be described later). A form and a material of first fiber sheet 1 are not particularly limited, and may be selected as appropriate according to an application thereof. Specifically, first fiber sheet 1 may have fiber structures such as a woven fabric, a knitted fabric, and a nonwoven fabric. Above all, in a case where fiber laminate 10 is used as a filter medium, first fiber sheet 1 is preferably a nonwoven fabric from the viewpoint of reducing a pressure loss.

The nonwoven fabric is manufactured by using, for example, a spun bonding method, a dry method (for example, an air-laid method), a wet method, a melt blow method, and a needle punch method. Above all, first fiber sheet 1 is preferably a nonwoven fabric manufactured by using the wet method in that the nonwoven fabric suitable for a base material is easily formed.

In a case where first fiber sheet 1 is a nonwoven fabric, materials of first fibers 1F forming first fiber sheet 1 are not particularly limited. The material of first fibers 1F may include, for example, glass fibers, cellulose, acrylic resin, polypropylene (PP), polyethylene (PE), polyester (for example, polyethylene terephthalate (PET) and polybutylene terephthalate), polyamide (PA), or mixtures thereof. Above all, as materials of first fibers 1F, PET or cellulose is preferably used from the viewpoint of being suitable for a filter medium. Average fiber diameter D1 of first fibers 1F is not particularly limited, and may be, for example, 1 μm to 40 μm, and may be 5 μm to 20 μm.

Average fiber diameter D1 is an average value of diameters of first fibers 1F. The diameter of first fiber 1F is a diameter of a section perpendicular to in a length direction of first fiber 1F. In a case where such a section is not circular, a maximum diameter may be considered as the diameter. A width in a direction perpendicular to the length direction of first fiber 1F when viewed from the normal direction of one principal surface of first fiber sheet 1 may be regarded as the diameter of first fiber 1F. Average fiber diameter D1 is an average value of diameters of, for example, any ten first fibers 1F contained in first fiber sheet 1 at any locations. This is also the same for average fiber diameters D2 and D3 which will be described later.

Thickness T1 of first fiber sheet 1 is not particularly limited, and may be 50 μm to 500 μm, and may be 150 μm to 400 μm.

Thickness T1 of first fiber sheet 1 is, for example, an average value of thicknesses of any ten locations in the first fiber sheet 1. This is also the same for thicknesses T2 and T3 which will be described later. The thickness of the fiber sheet is a distance between two principal surfaces of the fiber sheet. In a case where the fiber sheet is a nonwoven fabric, a thickness thereof may be obtained as follows. First, a section of fiber laminate 10 is imaged. A line perpendicular to one principal surface is drawn from any one point on the principal surface of the fiber sheet to the other principal surface. The distance between outsides (outside dimensions) of two fibers which are most distant from each other among fibers on the line corresponds to the thickness of the fiber sheet. This is similarly performed on a plurality of any other points (for example, nine points) so that thicknesses of the fiber sheet are calculated, and a numerical value obtained by averaging the thicknesses is used as the thickness of the fiber sheet. When the thickness is calculated, an image having undergone a binarization process may be used.

A mass per unit area of the first fiber sheet is not particularly limited, and may be, for example, 10 $g/m^2$ to 80 $g/m^2$, and may be 35 $g/m^2$ to 60 $g/m^2$.

A pressure loss of the first fiber sheet is also not particularly limited. Above all, in a case of performing measurement with a measuring machine in conformity with the regulations of JIS B9908, Form 1, an initial pressure loss of the first fiber sheet is preferably about 1 Pa to 10 Pa. As long as the initial pressure loss of the first fiber sheet falls within this range, an initial pressure loss of the whole of fiber laminate 10 is also reduced.

In the test method in the above mentioned Form 1, a pressure loss is measured as follows. A filter unit having fiber laminate 10 is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via tubes, respectively, and thus the pressure loss is obtained.

Second Fiber Sheet

Second fiber sheet 2 has a dust collection function, and functions as a protection layer which protects third fiber sheet 3 from an external load in a case where third fiber sheet 3 is laminated on first fiber sheet 1 as will be described later.

Second fiber sheet 2 may be, for example, a nonwoven fabric manufactured according to the above-described method. Above all, in a case where fiber laminate 10 is used as a filter medium, second fiber sheet 2 is preferably a nonwoven fabric manufactured by using the melt blow method. It is easy to form a nonwoven fabric having a small fiber diameter in the melt blow method. Second fiber sheet 2 is preferably charged (permanently charged) through a charging process in that a dust collection effect can be expected. Permanent charging is a state in which electric polarization is held semi-permanently, and an electric field is formed on the surroundings, in a case where an external electret fiber is not present.

Materials of second fibers 2F forming second fiber sheet 2 are not particularly limited. Materials of second fibers 2F may include, for example, glass fibers, cellulose, acrylic resin, PP, PE, polyester such as PET, PA, or mixtures thereof. Above all, PP is preferably used in that the material is easily charged. Average fiber diameter D2 of the second fibers is not also particularly limited. Average fiber diameter D2 may be, for example, 0.5 μm to 20 μm, and may be 3 μm to 20 μm.

Thickness T2 of second fiber sheet 2 is preferably smaller than thickness T1 of first fiber sheet 1. Consequently, second fiber sheet 2 easily fluctuates (has a wavy shape), and a very high gap is easily formed. Thus, it is possible to further increase a dust collection effect. Thickness T2 of second fiber sheet 2 is not particularly limited, and may be 100 μm to 500 μm, and may be 150 μm to 400 μm.

A mass per unit area of second fiber sheet 2 is not particularly limited, and may be 10 g/m$^2$ to 50 g/m$^2$, and may be 10 g/m$^2$ to 30 g/m$^2$.

A pressure loss of second fiber sheet 2 is also not particularly limited. Above all, an initial pressure loss of second fiber sheet 2 is preferably about 10 Pa to 50 Pa in a case where measurement is performed in the same condition as described above. As long as the initial pressure loss of second fiber sheet 2 falls within this range, an initial pressure loss of the whole of fiber laminate 10 is also reduced.

Adhesive

The kind of adhesive 4 is not particularly limited, and may be, for example, a hot melt adhesive having a thermosetting resin as a main component. Examples of the thermosetting resin may include polyurethane (PU), polyester such as PET, copolyester such as urethane modified copolymer polyester, PA, and polyolefin (for example, PP or PE). The hot melt adhesive is melted, for example, through heating, and is applied on first fiber sheet 1 or second fiber sheet 2 in a linear form. Alternatively, a granular hot melt adhesive is sprayed onto first fiber sheet 1 or second fiber sheet 2 in a linear form, and is melted through heating.

A mass of adhesive 4 held in fiber laminate 10 is not particularly limited, but is preferably 0.5 g/m$^2$ to 15 g/m$^2$, more preferably 1 g/m$^2$ to 10 g/m$^2$, and most preferably 2 g/m$^2$ to 6 g/m$^2$, from the viewpoint of bonding strength and pressure loss. The mass of adhesive 4 is an average mass of adhesive 4 held in fiber laminate 10.

Third Fiber Sheet

As described above, third fiber sheet 3 may be interposed between first fiber sheet 1 and second fiber sheet 2 so as to be in contact with first fiber sheet 1. In this case, from the viewpoint of increasing dust collection performance of fiber laminate 10, third fiber sheet 3 preferably contains third fibers 3F having average fiber diameter D3 smaller than average fiber diameter D1 of first fibers 1F and average fiber diameter D2 of second fibers 2F. A form of third fiber sheet 3 is not particularly limited, but, as will be described later, in a case where third fibers 3F are generated according to an electrostatic spinning method, third fiber sheet 3 is a non-woven fabric.

Third fiber sheet 3 is adhered to first fiber sheet 1 and second fiber sheet 2 via adhesive 4 disposed in linear first region R1. In second region R2, gap s is formed between third fiber sheet 3 and first fiber sheet 1, and/or between third fiber sheet 3 and second fiber sheet 2. Since second fiber sheet 2 is often thinner than first fiber sheet 1, second fiber sheet 2 often has a wavy shape in fiber laminate 10. In this case, in second region R2, a gap is formed at least between third fiber sheet 3 and second fiber sheet 2.

Average fiber diameter D3 is, for example, in a range from 10 nm to 3 μm, inclusive, and preferably from 10 nm to 900 nm, inclusive, and more preferably from 10 nm to 300 nm, inclusive. As long as average fiber diameter D3 falls within this range, a pressure loss is easily reduced, and dust collection efficiency is easily increased.

Materials of third fibers 3F are not particularly limited. Material of third fibers 3F may include, for example, polymers such as PA, polyimide, polyamideimide, polyetherimide, polyacetal, polycarbonate, polyether ether ketone, polysulfone, polyethersulfone (PES), polyphenylene sulfide, polytetrafluoroethylene, polyarylate, polyacrylonitrile, polyvinylidene fluoride (PVDF), polyvinyl alcohol, polyvinyl acetate, PP, PET, and PU. These materials may be used alone or in combination of two or more kinds thereof. Above all, in a case where third fibers 3F are formed by using an electrostatic spinning method, PES is preferably used. PVDF is preferably used in that average fiber diameter D3 is easily reduced.

Thickness T3 of third fiber sheet 3 is preferably 0.5 μm to 10 μm, and is more preferably 1 μm to 5 μm, from the viewpoint of pressure loss. In a case where measurement is performed in the same condition as described above, an initial pressure loss of third fiber sheet 3 is preferably about 5 Pa to 40 Pa.

A mass per unit area of third fiber sheet 3 is preferably 0.01 g/m$^2$ to 1.5 g/m$^2$, more preferably 0.05 g/m$^2$ to 1.2 g/m$^2$, and most preferably 0.1 g/m$^2$ to 1.0 g/m$^2$, from the viewpoint of balance between pressure loss and dust collection efficiency.

As described above, in fiber laminate 10, adhesive 4 is disposed so that fiber laminate 10 forms linear first region R1 having width W when viewed from the normal direction of the principal surface of fiber laminate 10. First fiber sheet 1 and second fiber sheet 2 are adhered to each other via linear adhesive 4. In the illustrated example, third fiber sheet 3 interposed between first fiber sheet 1 and second fiber sheet 2 is adhered to first fiber sheet 1 and second fiber sheet 2 via linear adhesive 4.

Adhesive 4 is disposed at predetermined interval (pitch) P so as to form a plurality of linear first regions R1 in a stripe shape. In strip-shaped fiber laminate 10, the plurality of first regions R1 are formed along a longitudinal direction of fiber laminate 10. In fiber laminate 10, as illustrated in FIG. 4, as illustrated in FIG. 4, gaps s are formed between first fiber sheet 1 and second fiber sheet 2 in second regions R2 other than linear first regions R1. As mentioned above, if adhesive 4 is disposed in first regions R1, a pressure loss can be reduced, and if gaps s are formed in second regions R2, high dust collection efficiency can be obtained.

As illustrated in FIG. 3, first region R1 is defined as a rectangular region having a minimum width surrounding adhesive 4.

Gap s is a space formed between first fiber sheet 1 and second fiber sheet 2 in second region R2. In a case where fiber laminate 10 includes third fiber sheet 3, gap s may be a gap formed between first fiber sheet 1 and second fiber sheet 2, and not only a gap between first fiber sheet 1 and third fiber sheet 3 but also a gap between third fiber sheet 3 and second fiber sheet 2 is included in gap s.

Maximum height h of gap s in a thickness direction of fiber laminate 10 is, for example, 1 μm to 300 μm, and is preferably 10 μm to 300 μm or 50 μm to 200 μm. As long as maximum height h of gap s falls within this range, high dust collection efficiency is easily ensured.

The height of gap s is a height in the thickness direction (the normal direction of the principal surface of fiber laminate 10) of fiber laminate 10. In a case where fiber laminate 10 does not include third fiber sheet 3, the height of gap s is a height of a gap formed between first fiber sheet 1 and second fiber sheet 2 in the thickness direction of fiber laminate 10. In a case where fiber laminate 10 includes third fiber sheet 3, the height of gap s is heights of a gap formed between first fiber sheet 1 and third fiber sheet 3 and a gap formed between second fiber sheet 2 and third fiber sheet 3 in the thickness direction of the fiber laminate. In a case where gaps are formed both between first fiber sheet 1 and third fiber sheet 3 and between third fiber sheet 3 and second fiber sheet 2, a sum of heights thereof is the height of gap s in the thickness direction of the fiber laminate.

Maximum height h of gap s is an average value obtained by obtaining the maximum value of a height of a single gap sandwiched between adjacent first regions R1 with respect to respective gaps (for example, five gaps), and averaging the maximum values. For example, as illustrated in FIG. 4, with respect to a section of fiber laminate 10 in a direction perpendicular to linear first region R1, an electron microscope image thereof may be captured, the maximum heights of a plurality of any (for example, five) gaps may be obtained and averaged, and thus maximum height h of gap s may be obtained.

Maximum height h of gap s may be equal to or less than thickness T2 of second fiber sheet 2, but may be more than thickness T2. In a case where maximum height h of gap s is more than thickness T2, second fiber sheet 2 easily has a wavy shape, a surface area is easily increased, and thus it is possible to further increase dust collection efficiency.

Maximum height h of gap s may be equal to or more than thickness T1 of first fiber sheet 1, but may be less than thickness T1. In a case where maximum height h of gap s is less than thickness T1, it is possible to reduce a variation in performance (dust collection performance) in a surface direction of fiber laminate 10.

Maximum height h of gap s may be equal to or less than thickness T3 of third fiber sheet 3. However, maximum height h of gap s is preferably more than thickness T3 from the viewpoint of easily ensuring high dust collection efficiency and low pressure loss.

Adhesive 4 may be disposed in a linear form as a whole in first region R1, may be disposed in a wavy line form as illustrated in FIG. 3, and may be disposed in a straight line form. FIG. 3 illustrates a case where adhesive 4 is continuously disposed in first region R1, but this case is only an example. Adhesive 4 may be intermittently disposed in first region R1. A case where adhesive 4 is intermittently disposed may be, for example, a case where adhesive 4 is disposed in a wavy line form or a dotted line form. Adhesive 4 which is intermittently disposed may have a straight line form, and may have a wavy line shape.

In the illustrated example, first regions R1 are formed over the entire surface of fiber laminate 10, but are not limited to this case, and first regions R1 may be unevenly distributed. For example, first regions R1 may be densely formed at an end in a width direction of fiber laminate 10, and may be densely formed at the center in the width direction.

Average width W of first regions R1 is preferably in a range from 0.1 mm to 10 mm, inclusive, and is more preferably from 1 mm to 5 mm, inclusive. As long as average width W falls within this range, it is possible to ensure high peeling strength between the fiber sheets and also to easily reduce a pressure loss.

Average width W of first regions R1 is an average value of widths W of first regions R1 at a plurality of any (for example, five) locations.

In a case where adhesive 4 is disposed to form a plurality of linear first regions R1, average pitch P between two adjacent first regions R1 is not particularly limited, but is preferably, for example, 1 mm or more from the viewpoint of reducing a pressure loss. Average pitch P is more preferably in a range from 1 mm to 10 mm, inclusive, or from 2 mm to 20 mm. As long as average pitch P falls within this range, it is possible to reduce a pressure loss, and also to effectively suppress peeling between the fiber sheets even with a small amount of adhesive 4. Gap s is easily formed between adjacent first regions R1.

Pitch P between first regions R1 is a distance between central lines (central lines of first regions R1 in the width direction) Lc of two adjacent first regions R1 as illustrated in FIG. 3. Average pitch P is an average value of values obtained by measuring a distance between central lines Lc of two adjacent first regions R1 with respect to a plurality of any (for example, five) locations. Central line Lc of first region R1 is a straight line which equally divides the transverse direction of linear first region R1 into two parts.

From the viewpoint of reducing a pressure loss, and easily suppressing peeling between the fiber sheets, when fiber laminate 10 is viewed from the normal direction of the principal surface thereof, a total area of first regions R1 is preferably less than 50% of an area of the principal surface of fiber laminate 10, and is more preferably in a range from 5% to 45%, inclusive, or from 10% to 40%, inclusive.

In the illustrated example, a case has been described in which linear first region R1 is formed along the longitudinal direction of strip-shaped fiber laminate 10, but this case is only an example. First region R1 may be formed to be inclined with respect to the longitudinal direction of fiber laminate 10, and may be formed along the width direction of fiber laminate 10. These may be combined with each other as appropriate. In a case where strip-shaped fiber laminate 10 is formed, the first region R1 is preferably formed along the longitudinal direction of fiber laminate 10 or to be inclined with respect to the longitudinal direction from the viewpoint of capable of continuously applying adhesive 4. An angle formed between the central line Lc of first region R1 in the width direction and the longitudinal direction of fiber laminate 10 is preferably, for example, in a range from 0° to 15°, inclusive.

In fiber laminate 10, mass M per unit area of adhesive 4 is preferably in a range from 0.5 $g/m^2$ to 15 $g/m^2$, inclusive, and is more preferably from 1 $g/m^2$ to 10 $g/m^2$, inclusive. For example, mass M per unit area of adhesive 4 may be obtained, for example, by obtaining masses of adhesive 4 in a plurality of regions each having a predetermined area (for example, 10 cm×10 cm), converting the respective masses into masses per unit area (1 $m^2$), and averaging the masses.

In a case where fiber laminate 10 is used as a filter medium of an air purifier, fiber laminate 10 is disposed so that air is taken from the outside of second fiber sheet 2 to the outside of first fiber sheet 1.

Fiber laminate 10 is manufactured as follows, for example. First, strip-shaped first fiber sheet 1 and strip-shaped second fiber sheet 2 are prepared. Next, adhesive 4 is applied on a principal surface of first fiber sheet 1 in a linear form. Second fiber sheet 2 is laid on the principal surface of first fiber sheet 1, and first fiber sheet 1 is adhered to second fiber sheet 2 via adhesive 4 so that at least one of second fiber sheet 2 and first fiber sheet 1 has a wavy shape.

In the above-described way, gaps s are formed between first fiber sheet 1 and second fiber sheet 2.

In other words, a manufacturing method of fiber laminate 10 includes, for example, a preparation step, an adhesive applying step, and a laminate step. A third fiber sheet forming step may be further provided.

(1) Preparation Step

In the preparation step, first fiber sheet 1 and second fiber sheet 2 are prepared.

(2) Third Fiber Sheet Forming Step

Before the adhesive applying step which will be described later, fibers (third fibers 3F) may be accumulated on the principal surface of first fiber sheet 1 to which adhesive 4 is applied, and thus third fiber sheet 3 may be laminated. In a case where fiber laminate 10 is used as a filter medium, third fiber sheet 3 is provided, and thus it is possible to expect improvement in dust collection performance. In this step, first fiber sheet 1 is a target of the sprayed raw material liquid, and functions as a collector collecting third fibers 3F. In this case, first fiber sheet 1 and second fiber sheet 2 are laminated with third fiber sheet 3 interposed therebetween.

In the electrostatic spinning method, a raw material liquid is used which contains a raw material resin as a raw material of fibers and a solvent dissolving the raw material resin. The raw material liquid contains the raw material resin and the solvent. The raw material resin is a raw material of third fibers 3F, and is a polymer exemplified as a material of third fibers 3F. The solvent (hereinafter, referred to as a first solvent) dissolves the raw material resin. Fibers including the raw material resin and the first solvent are formed from the raw material liquid. A mixing ratio of the raw material resin and the first solvent in the raw material liquid differs depending on the kind of selected raw material resin and the kind of first solvent. A proportion of the first solvent in the raw material liquid is, for example, 60% by mass to 95% by mass, inclusive. The raw material liquid may contain not only the first solvent dissolving the raw material resin but also other solvents or various additives.

The first solvent is not particularly limited as long as the solvent can dissolve the raw material resin of third fibers 3F and remove the raw material resin through volatilization, and a solvent which is selected as appropriate from water and an organic solvent may be used depending on the kind of raw material resin or manufacturing conditions. As the solvent, an aprotic polar organic solvent is preferably used. Such a solvent may include, for example, amide (for example, chain or cyclic amide) or sulfoxide. Examples of amide include N,N-dimethylformamide (DMF), N,N-dimethylacetamide (DMAc), and N-methyl-2-pyrrolidone (NMP). An example of sulfoxide includes dimethyl sulfoxide. These solvents may be used alone or in combination of plural kinds thereof. Above all, amide such as DMAc or DMF is preferred in that a raw material resin such as PS or PU is easily dissolved, and electrostatic spinning is easily performed.

(3) Adhesive Applying Step

Adhesive 4 is applied on the principal surface of first fiber sheet 1 on which third fiber sheet 3 is formed. Preferably, a hot melt adhesive is coated on the principal surface of linear first fiber sheet 1 while being melted.

(4) Laminate Step

Finally, fiber laminate 10 may be manufactured by laminating first fiber sheet 1 and second fiber sheet 2 via adhesive 4 (and third fiber sheet 3 as necessary). At this time, second fiber sheet 2 is laid on the principal surface of first fiber sheet 1 via third fiber sheet 3 as necessary, and first fiber sheet 1 and second fiber sheet 2 are adhered to each other via adhesive 4 so that at least one of first fiber sheet 1 and second fiber sheet 2 has a wavy shape. Consequently, gaps s are formed between first fiber sheet 1 and second fiber sheet 2 in second regions R2 other than linear first regions R1.

A width of one of first fiber sheet 1 and second fiber sheet 2 may be larger than a width of the other so that at least one of first fiber sheet 1 and second fiber sheet 2 easily has a wavy shape. First fiber sheet 1 functions as a base material, and is thus often thicker than second fiber sheet 2. Thus, a width of second fiber sheet 2 is preferably larger than a width of first fiber sheet 1.

In the laminate step, first fiber sheet 1, and second fiber sheet 2 laid on first fiber sheet 1 via adhesive 4 (and third fiber sheet 3 as necessary) are fed between a pair of rollers so as to be pressed. In the above-described way, first fiber sheet 1 and second fiber sheet 2 are adhered to each other. As the rollers, well-known pressing rollers may be used. In order to dispose adhesive 4 in linear first region R1, pressing may be performed by using a pair of rollers with a spacer interposed therebetween. If a laminated product of the fiber sheets is fed to the rollers so that the spacer corresponds to first region R1, first fiber sheet 1 and second fiber sheet 2 may be adhered to each other in first region R1. In second region R2, gap s having large maximum height h is easily secured between first fiber sheet 1 and second fiber sheet 2.

As the spacer, for example, a ring-shaped protrusion (push ring) attached to a circumferential surface of the roller may be used. The ring-shaped protrusion is preferably provided at a position corresponding to first region R1 on the circumferential surface of the roller. For example, a position of the protrusion or a position where the first region is formed is preferably adjusted so that at least central line Lc of first region R1 and the vicinity thereof can be pushed by the ring-shaped protrusion. The ring-shaped protrusion may be provided on either of a pair of rollers, and may be provided on both thereof.

A width or a height of the spacer is adjusted as appropriate by taking into consideration, for example, a thickness of fiber laminate 10, an amount of adhesive 4 to be applied, and/or a width of first region R1.

If the third fiber sheet forming step is omitted, a fiber laminate not including third fiber sheet 3 can be manufactured.

The above-described manufacturing method of fiber laminate 10 may be performed by, for example, a manufacturing apparatus which conveys first fiber sheet 1 from an upstream side to a downstream side of a manufacturing line, forms third fiber sheet 3 on the principal surface of conveyed first fiber sheet 1, and then laminates second fiber sheet 2 thereon.

Figure 6:
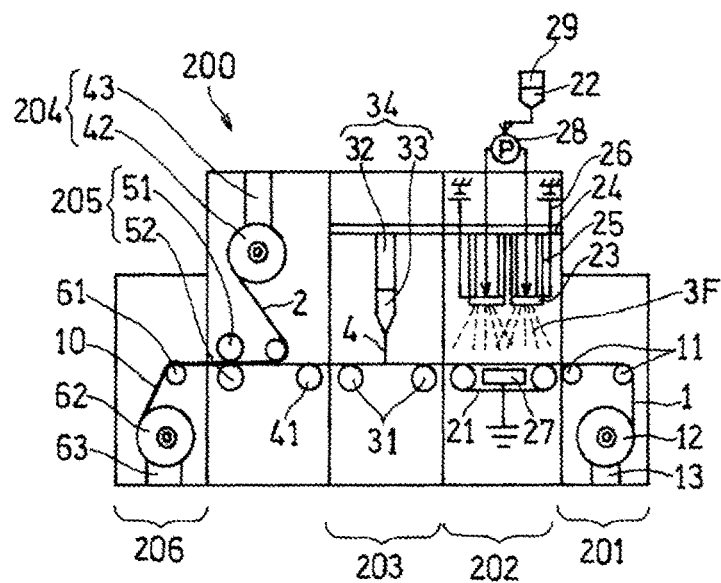
FIG. 6 is a diagram schematically illustrating a configuration of an example of a manufacturing apparatus of the fiber laminate according to the embodiment of the present disclosure.

Hereinafter, with reference to FIG. 6, a description will be made of manufacturing apparatus 200, but manufacturing apparatus 200 does not limit the present disclosure. FIG. 6 is a diagram schematically illustrating an example of a configuration of manufacturing apparatus 200 of fiber laminate 10. Manufacturing apparatus 200 includes a manufacturing line for manufacturing fiber laminate 10. In manufacturing apparatus 200, first fiber sheet 1 is conveyed from an upstream side to a downstream side of the manufacturing line.

Manufacturing apparatus 200 includes, for example, the following configuration.

(1) First fiber sheet feeding device 201 which feeds first fiber sheet 1 to conveyer 21

(2) Third fiber sheet forming device 202 which generates third fibers 3F from raw material liquid 22, and forms third fiber sheet 3 by using electrostatic force (3) Adhesive applying device 203 which applies adhesive 4 from an upper side of first fiber sheet 1 sent from third fiber sheet forming device 202

(4) Second fiber sheet laminate device 204 which laminates second fiber sheet 2 on first fiber sheet 1 via adhesive 4 and third fiber sheet 3

First Fiber Sheet Feeding Device

First fiber sheet feeding device 201 which accommodates therein first fiber sheet 1 wound in a roll form is provided on the most upstream side of manufacturing apparatus 200. First fiber sheet feeding device 201 rotates first feed reel 12 with motor 13 so as to feed first fiber sheet 1 wound on first feed reel 12 to conveyance rollers 11.

Third Fiber Sheet Forming Device

First fiber sheet 1 is conveyed to third fiber sheet forming device 202 including an electrostatic spinning unit (not illustrated) by conveyance rollers 11. The electrostatic spinning mechanism provided in the electrostatic spinning unit includes discharger 23, a charger (which will be described later), and conveyer 21. Discharger 23 is provided on an upper side in the apparatus and discharges raw material liquid 22 of third fibers 3F. The charger positively charges discharged raw material liquid 22. Conveyer 21 is disposed to face discharger 23 and conveys first fiber sheet 1 from the upstream side to the downstream side. Conveyer 21 functions as a collector which collects third fibers 3F along with first fiber sheet 1. The number of electrostatic spinning unit is not particularly limited, and may be one, or two or more.

A plurality of discharge outlets (not illustrated) of raw material liquid 22 are provided on discharger 23 side facing the principal surface of first fiber sheet 1. Discharger 23 is supported by second support 25 in such a manner that its own longitudinal direction is parallel to the principal surface of first fiber sheet 1. Second support 25 is provided above the electrostatic spinning unit, and extends downwardly from first support 24. First support 24 is provided in parallel to the conveyance direction of first fiber sheet 1.

The charger is formed of voltage applying device 26 applying a voltage to discharger 23, and counter electrode 27 provided to be parallel to conveyer 21. Counter electrode 27 is grounded (connected to the ground). Consequently, a potential difference (for example, 20 kV to 200 kV) corresponding to the voltage applied by voltage applying device 26 can be caused between discharger 23 and counter electrode 27. The configuration of the charger is not particularly limited. For example, counter electrode 27 may be negatively charged. The belt portion of conveyer 21 may be formed of a conductor instead of providing counter electrode 27.

Discharger 23 has a long shape and is formed of a conductor. An interior of discharger 23 is provided with a cavity. The cavity functions as an accommodator accommodating raw material liquid 22 therein. Raw material liquid 22 is supplied from raw material liquid tank 29 to the cavity of discharger 23 by a pressure produced by pump 28 communicating with the cavity of discharger 23. Raw material liquid 22 is discharged from the discharge outlet toward the principal surface of first fiber sheet 1 by the pressure produced by pump 28. Discharged raw material liquid 22 causes electrostatic explosion to generate a fibrous material (third fibers 3F) during movement in a charged state in a space (generation space) between discharger 23 and first fiber sheet 1. Generated third fibers 3F are accumulated on first fiber sheet 1 so as to form third fiber sheet 3 illustrated in FIG. 5.

A configuration of the electrostatic spinning mechanism forming third fibers 3F is not limited to the above-described configuration. As long as a mechanism can generate third fibers 3F from raw material liquid 22 by an electrostatic force in a predetermined generation space of third fibers 3F, and can accumulate generated third fibers 3F on the principal surface of first fiber sheet 1, the mechanism can be used without being particularly limited.

Adhesive Applying Device

After third fiber sheet 3 is formed, first fiber sheet 1 is conveyed to adhesive applying device 203. In adhesive applying device 203, adhesive 4 is applied to first fiber sheet 1 via third fiber sheet 3 from the upper side of first fiber sheet 1.

Adhesive applying device 203 includes, for example, adhesive tank 32, applicator 34, and conveyance rollers 31. Adhesive tank 32 is provided on an upper side in adhesive applying device 203 and accommodates adhesive 4. Applicator 34 has nozzle 33 for coating adhesive 4 so that a linear region is formed on first fiber sheet 1. Conveyance rollers 31 convey first fiber sheet 1 to the downstream side. Adhesive tank 32 or nozzle 33 is provided with a heating device (not illustrated), and thus adhesive 4 which is a hot melt resin is discharged while being melted.

Second Fiber Sheet Laminate Device

Next, the laminate is conveyed to second fiber sheet laminate device 204 provided with conveyance roller 41. In second fiber sheet laminate device 204, second fiber sheet 2 is fed from the upper side of first fiber sheet 1, and is laminated on first fiber sheet 1 via adhesive 4 and third fiber sheet 3. In a case where second fiber sheet 2 is long, second fiber sheet 2 may be wound on second feed reel 42 in the same manner as first fiber sheet 1. In this case, second fiber sheet 2 is unwound from second feed reel 42 rotated by motor 43 and is laminated on first fiber sheet 1.

Pressing Device

After second fiber sheet 2 is laminated, fiber laminate 10 is conveyed to pressing device 205. Pressing device 205 includes, for example, pressing roller 51 disposed on the upper side and pressing roller 52 disposed on the lower side with fiber laminate 10 interposed therebetween. Fiber laminate 10 is pressed with pressing rollers 51 and 52, and thus first fiber sheet 1 and second fiber sheet 2 are more tightly adhered to each other. As at least one of pressing rollers 51 and 52, as described above, a roller provided with a spacer may be used.

Collecting Device

Finally, fiber laminate 10 is conveyed from pressing device 205, and is then conveyed to collecting device 206 which is disposed on the further downstream side, via roller 61. For example, collecting device 206 has therein collecting reel 62 for winding conveyed fiber laminate 10 thereon. Collecting reel 62 is rotatably driven by motor 63.

EXAMPLES

Hereinafter, the present embodiment will be described in detail on the basis of Examples and comparative examples, but the present disclosure is not limited to the following Examples.

Example 1

Fiber laminate 10 is manufactured in the following procedures. First fiber sheet 1 (thickness: 300 μm, width: 500 mm, D1: 15 μm, and mass per unit area: 42 g/m$^2$) formed of cellulose fibers, polyester fibers, and acryl fibers is prepared.

By using manufacturing apparatus 200 illustrated in FIG. 6, third fibers 3F are accumulated on first fiber sheet 1 so as to laminate third fiber sheet 3 on first fiber sheet 1. As a raw material liquid of third fibers 3F, a DMAc solution containing 20% by mass of PES is used. Average fiber diameter D3 of obtained third fibers 3F is 273 nm, and the average mass per unit area thereof is 0.93 g/m$^2$.

Next, adhesive 4 (polyester-based hot melt resin; melting point: about 100° C.) is melted, and is applied on a principal surface of third fiber sheet 3 in a wavy line form as illustrated in FIG. 3. At this time, adhesive 4 is applied so that average width W of linear first regions R1 in which adhesive 4 is disposed is 1 mm, and average pitch P between adjacent first regions R1 is 9 mm. An amount of adhesive 4 is adjusted so that an amount per unit area of adhesive 4 held in fiber laminate 10 is 3.6 g/m$^2$.

Next, a melt blow nonwoven fabric (thickness: 165 μm, width: 550 mm, D2: 5 μm, and mass per unit area: 18 g/m$^2$) which is formed mainly of PP fibers is laminated on third fiber sheet 3 as second fiber sheet 2. The obtained laminated product is fed between pressing rollers 51 and 52, and is pushed in the thickness direction so as to be pressed, so that fiber laminate 10 is manufactured. As one of pressing rollers 51 and 52, a roller (width of push ring: 5 mm, and pitch between push rings: 9 mm) provided with push rings of 60 columns at the same interval on a peripheral surface thereof is used. Pushing pressure is 10 kPa.

Fiber laminate 10 is cut in the width direction so that first region R1 is crossed, and a section image is captured with a scanning electron microscope (SEM). It is confirmed from an SEM picture that gaps s are formed between second fiber sheet 2 and third fiber sheet 3 in second region R2 between adjacent first regions R1. Maximum height h of the gap is measured with respect to five gaps, and an average value thereof is obtained and evaluated as 179 μm.

Regarding a sucking test, the fiber laminate is cut with a size of 12 cm×12 cm, and atmospheric dust is sucked to an obtained test piece at a surface wind speed of 5.3 cm/sec from the outside of second fiber sheet 2. Air pressure $P_0$ on the upstream side and air pressure $P_1$ on the downstream side of the test piece are measured, and a calculated pressure loss ($=P_0-P_1$) is evaluated as 48 Pa. A manometer conforming to the regulations of JIS B 9908, Form 1 is used to measure air pressure.

When the pressure loss measurement is performed, atmospheric dust concentration (number) $C_0$ on the upstream side and atmospheric dust concentration (number) $C_1$ on the downstream side of the test piece are measured, and calculated dust collection efficiency ($=(1-C_1/C_0)\times100(\%)$) is evaluated as 99.993%. The number concentration is measured by using a light scattering type automatic particle counter (Particle Counter KC-01E manufactured by Rion Co., Ltd).

Comparative Example 1

Instead of melted adhesive 4, a powdery adhesive (polyester-based hot melt resin; melting point: about 100° C.) is evenly sprayed on the entire principal surface of the third fiber sheet. As a pressing roller, a pair of pressing rollers whose circumferential surfaces are flat and which has a built-in heater is used, and the laminated product is pressed while being heated. The fiber laminate is manufactured and is evaluated in the same manner as in Example 1 except for this. In a section image of the fiber laminate in Comparative Example 1, gaps which are observed in Example 1 are not observed between the second fiber sheet and the third fiber sheet. A pressure loss of the fiber laminate is 66 Pa, and the dust collection efficiency is evaluated as 99.971%.

As mentioned above, the fiber laminate of the present disclosure can reduce a pressure loss and achieve high dust collection efficiency. Thus, the fiber laminate can be appropriately used for a filter medium of an air purifier or an air conditioner. The fiber laminate is also used for a separation sheet for a battery, a membrane for a fuel cell, an extracorporeal inspection sheet such as a pregnancy test sheet, a medical sheet, a dustproof cloth such as a dustproof mask or a dustproof wear, a wiping sheet for wiping dust, and the like.

What is claimed is:

1. A fiber laminate comprising:
   a first fiber sheet containing first fibers;
   a second fiber sheet laminated on the first fiber sheet and containing second fibers; and
   an adhesive interposed between the first fiber sheet and the second fiber sheet,
   wherein the adhesive is disposed to form a linear first region in the fiber laminate when viewed from a normal direction of a principal surface of the fiber laminate,
   the first fiber sheet and the second fiber sheet are adhered to each other via the first region,
   a gap is provided between the first fiber sheet and the second fiber sheet in a second region other than the first region,
   the second fiber sheet is thinner than the first fiber sheet, and
   a maximum height of the gap in a thickness direction of the fiber laminate is more than a thickness of the second fiber sheet.

2. The fiber laminate according to claim 1,
   wherein the maximum height of the gap in the thickness direction of the fiber laminate is less than a thickness of the first fiber sheet.

3. The fiber laminate according to claim 1,
   wherein a maximum height of the gap in a thickness direction of the fiber laminate is in a range from 1 μm to 300 μm, inclusive.

4. The fiber laminate according to claim 1,
   wherein the fiber laminate has a strip shape, and
   the first region is formed along a longitudinal direction of the fiber laminate.

5. The fiber laminate according to claim 1,
   wherein the first region is one of a plurality of first regions, and
   wherein the adhesive is disposed to form the plurality of first regions.

6. The fiber laminate according to claim 5,
   wherein an average pitch P between adjacent ones of the first regions is 1 mm or more.

7. The fiber laminate according to claim 5,
   wherein an average width W of the first regions is in a range from 0.1 mm to 10 mm, inclusive.

8. The fiber laminate according to claim 1,
   wherein the adhesive is intermittently disposed in the first region.

9. A fiber laminate comprising:
   a first fiber sheet containing first fibers;
   a second fiber sheet laminated on the first fiber sheet and containing second fibers;
   an adhesive interposed between the first fiber sheet and the second fiber sheet; and
   a third fiber sheet interposed between the first fiber sheet and the second fiber sheet, in contact with the first fiber sheet, and containing third fibers having an average fiber diameter smaller than an average fiber diameter of the first fibers and an average fiber diameter of the second fibers, wherein the adhesive is disposed to form a linear first region in the fiber laminate when viewed from a normal direction of a principal surface of the fiber laminate, the first fiber sheet and the second fiber sheet are adhered to each other via the first region, a gap is provided between the first fiber sheet and the second fiber sheet in a second region other than the first region, and a maximum height of the gap in a thickness direction of the fiber laminate is more than a thickness of the third fiber sheet.

10. A manufacturing method of a fiber laminate, comprising:

preparing a strip-shaped first fiber sheet containing first fibers and a strip-shaped second fiber sheet containing second fibers;

applying an adhesive on a principal surface of the first fiber sheet in a linear form; and laying the second fiber sheet on the principal surface of the first fiber sheet, and adhering the first fiber sheet to the second fiber sheet via the adhesive so that at least one of the second fiber sheet and the first fiber sheet has a wavy shape, and thus a gap is provided between the first fiber sheet and the second fiber sheet, wherein, when the first fiber sheet is adhered to the second fiber sheet, the first fiber sheet and the second fiber sheet laid on the first fiber sheet are fed and pressed between a pair of rollers with a spacer interposed the pair of rollers.

11. A manufacturing method of a fiber laminate, comprising:

preparing a strip-shaped first fiber sheet containing first fibers and a strip-shaped second fiber sheet containing second fibers;

applying an adhesive on a principal surface of the first fiber sheet in a linear form; and laying the second fiber sheet on the principal surface of the first fiber sheet, and adhering the first fiber sheet to the second fiber sheet via the adhesive so that at least one of the second fiber sheet and the first fiber sheet has a wavy shape, and thus a gap is provided between the first fiber sheet and the second fiber sheet, wherein a width of the second fiber sheet is larger than a width of the first fiber sheet.

* * * * *